Oct. 29, 1968 — H. G. KELLER — 3,407,672
POWER TRANSMITTING CHAIN
Filed April 25, 1967
2 Sheets-Sheet 1
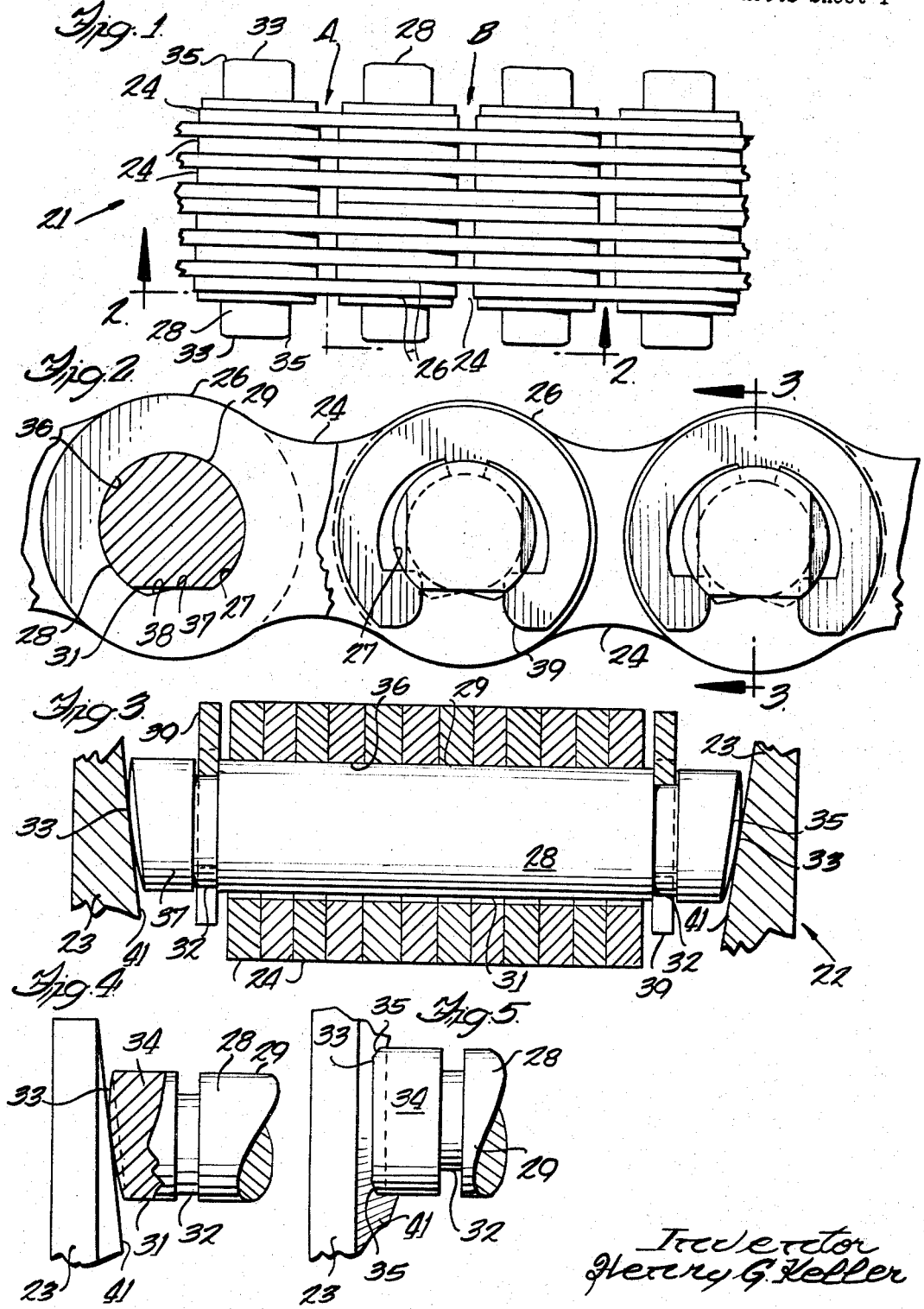
Inventor
Henry G. Keller

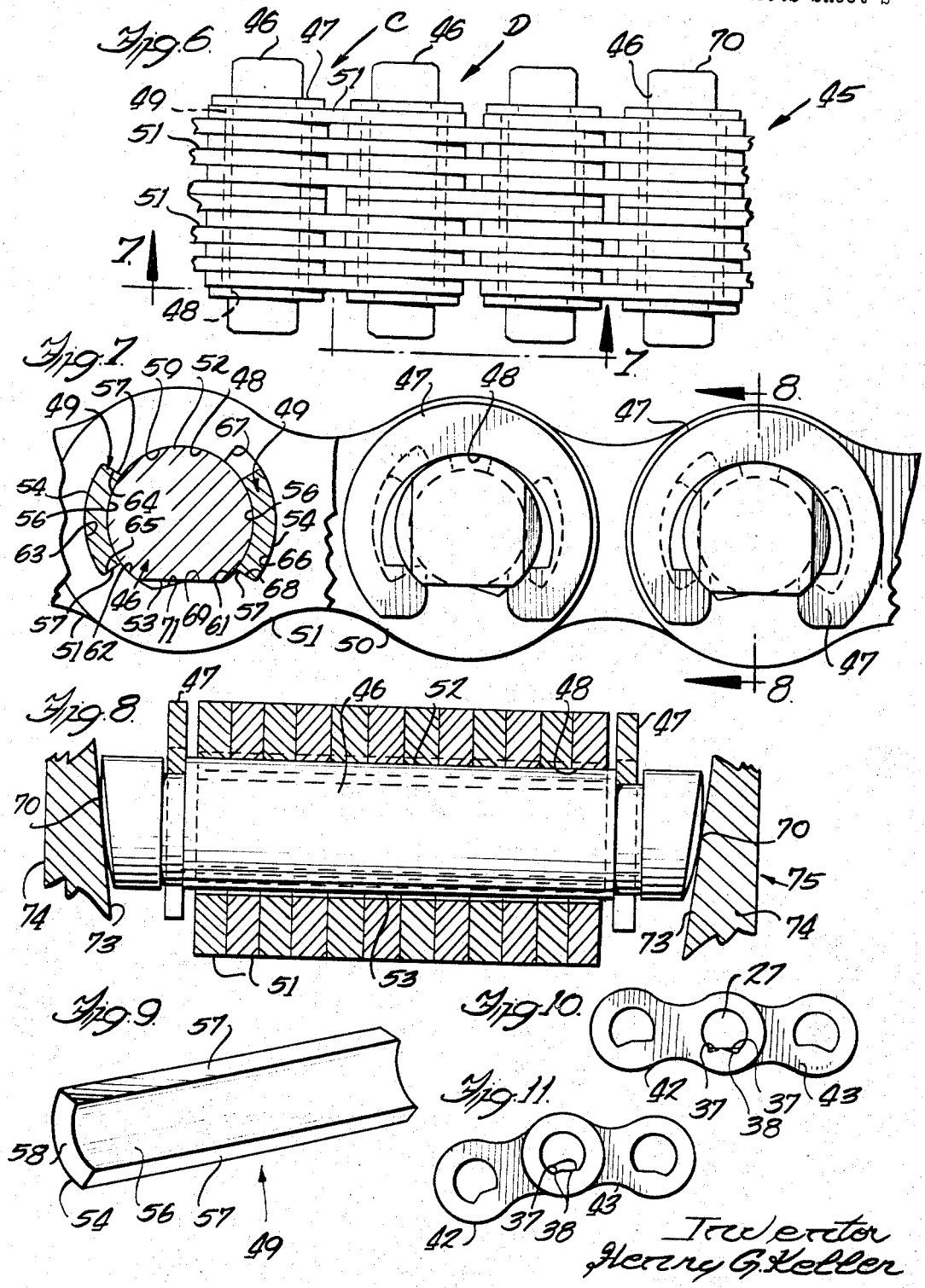

United States Patent Office 3,407,672
Patented Oct. 29, 1968

3,407,672
POWER TRANSMITTING CHAIN
Henry G. Keller, Glenside, Pa., assignor to
FMC Corporation, a corporation of Delaware
Filed Apr. 25, 1967, Ser. No. 633,481
8 Claims. (Cl. 74—236)

ABSTRACT OF THE DISCLOSURE

A chain for transmitting power between two expansible, variable pitch diameter sheaves of a variable speed transmission. The chain includes pins having end surfaces which engage opposed, conical driving flanges of the sheaves, these surfaces preferably being formed in a parti-cylindrical shape. The chain also includes means cooperating between the pins and links for properly positioning the pins prior to their engaging the sheaves.

BACKGROUND OF THE INVENTION

Field of the invention

This invention relates generally to articulated power transmitting chains, and more particularly to new and useful improvements in power transmitting chains including pins having end surfaces for engaging the opposed driving flanges of an expansible, variable pitch diameter sheave.

Description of the prior art

Several chains have been designed for use with expansible, variable pitch diameter sheaves and can be classified into two categories, as follows: (1) chains having a portion of the connecting link member engaging the opposed driving flanges of the sheave; (2) chains having extended end pins wherein the end surfaces of the extended pins engage the opposed driving flanges of the sheave. A representative chain of the first category is one wherein the link members are cylindrical in shape with the axis of the cylinder extending along the length of the chain. In the above described design, the cylindrical links are generally permitted to rotate about their axis, thus distributing wear around the perimeter of the cylindrical link. Although distribution of wear is an advantage of this type chain, the weight of the cylindrical link is a disadvantage since it limits the maximum speed capability of the chain. A further disadvantage of a chain of the above described design is that it requires more material and assembly time than does a chain of the second category, thus being relatively more expensive to manufacture.

Articulated power transmitting chains of the second category include extended pins having end surfaces formed to engage opposed, conical driving flanges of a variable pitch diameter sheave. Previously designed chains in the last described category have included pins having end surfaces formed in a conical shape with the apex of the cone extending outwardly of the pin and coinciding with the axis of the latter. Another design includes end surfaces having the configuration of an interior cone which conforms with the conical surfaces of the opposed driving flanges.

A common disadvantage of the above described chains, and other previously designed chains of the second category, is that when the pins are in engagement with the sheave there is no allowance for misalignment of the axis of the pin relative to the axis of the sheave. Thus, if these chains initially engage the sheave in a slightly twisted manner, they then are forced into alignment, thus causing vibrations in the chain which may limit the maximum speed at which the chain is capable of operating.

It is essential to the proper operation of the type chain of the present invention, that the pins be of equal lengths so that at a given pitch diameter of the expansible sheave, all of the end surfaces of the pins within the sheave contact the opposed driving flanges. If some of the pins are of a greater length than others, then the end surfaces of the longer pins will contact the opposed driving flanges while those of a lessor length will not. If the above mentioned condition exists the effective contact area between the end surfaces of the pin and the opposed driving flanges of the sheave is reduced and the maximum power output thus limited due to the slippage of the pins on the driving surfaces of the sheave. Due to the end surface configurations of previously designed pins, they have been difficult to manufacture with all of the pins being of equal lengths.

To increase the maximum power of an infinitely variable speed transmission comprising driving and driven members capable of expanding to various pitch diameters, some sheaves have been designed to include opposed outer flanges having conical driving surfaces and a substantially flat plate positioned therebetween. In a sheave of the above described design, commonly referred to as a double row sheave, one chain engages one of the outer conical driving flanges and also one of the faces of the intermediate plate, and a second chain engages the other face of the intermediate member and the other outer conical driving flange. The double row sheave is advantageous since it has approximately twice the maximum power capability as does a single row sheave. Previously designed chains falling within the second category have not been applicable to a double row sheave, whereas the cylindrical link chain of the first category may be used with either a single or a double row sheave.

In general, previously designed chains have not solved the problem of providing a chain with both a high speed and also a high maximum power capability. The speed capability of previously designed chains has been limited either by their weight or by vibrations caused as the engaging members of the chain enter the sheave. These vibrations can be caused by either chain being so designed that it will not misalign slightly within the sheave or being so designed that it will articulate in more than one direction. Of course chains have been designed with a high-speed capability, but the same chains designed for a high-speed capability are not also adaptable for a high maximum power output transmission.

The maximum power output of previously designed chains have been limited either by their non-adaptability to double row sheaves or by the strength of the link members of the chain. As with the speed capability, previously designed chains have had a high maximum power capability, but the same chains have not also been adaptable to high speed applications due to their high weight per unit length.

SUMMARY OF THE INVENTION

The chain of the present invention includes laterally spaced link members having their end portions overlapped with the end portions of link members of adjacent pitches and being connected by pins passing transversely therethrough. The pins are so formed that their end surfaces are parti-cylindrical in shape with the parti-cylindrical surfaces having a common axis normal to the longitudinal axis of the pin. As the chain articulates around the sheave the parti-cylindrical end surfaces of the pin engage the conical driving surfaces of the sheave. With the pin engagement with the sheave the common axis of the parti-cylindrical end surfaces is so positioned relative to the axis of the sheave that it is displaced radially outwardly of the axis of the pin. Also the configuration of the end surfaces of the pin is so formed that there is an outward force on the pin tending to keep the chain taut at all times.

Formed in each end portion of the link members is a pitch hole which passes transversely therethrough and cooperates with the pin for properly orienting the latter prior to its engaging the sheave. Also the pitch hole and pin are so formed to only allow limited rotational movement of the pins relative to the pitch holes when the chain articulates around the sheave.

A modification of the above described embodiment of the invention includes bushing members disposed between the inner surface of the pitch hole and the pin. The bushings are so formed that they cooperate with the pitch holes to limit articulation of the chain to only one direction. Also to improve wear the links may be selectively hardened so that the wear surface is harder than the rest of the link.

The pin configuration, which is the sheave engaging member, is such that if the pin enters the sheave in a slightly twisted fashion the pin will have forces applied thereto tending to align the latter. The forces tending to align the pin will not be shock forces, since the outward force tending to keep the chain taut will gradually pivot the pin about the common axis of the parti-cylindrical surfaces so that the pin axis comes into parallelism with the axis of the sheave. The configuration of the pins and the pitch holes in the first embodiment of the invention and in the modification including the bushings will limit the chain articulation to only one direction, therefore forming what is known in the art as a no-back bend chain. The no-back bend chain has less of a tendency to whiplash, i.e. that portion of the chain entering the sheave has less of a tendency to flutter upwardly and downwardly thus causing vibrations. The no-back bend configuration maintains the portion of the chain entering the sheave in a straight-line relationship so that the pins initially engage the sheave at the ideal point, thus eliminating one cause of high-speed vibrations.

Therefore the chain of the present invention is capable of high-speed applications due to its low weight per unit length and its vibration limiting configuration.

Like the previously described chains having cylindrical links, the chain of the present invention may be used with a double row sheave, therefore it has a higher power capability than does a chain adaptable for use only with a single row sheave. Also the number and arrangement of the link members in the pitches of the chain of the present invention may be varied to increase the load bearing strength thereof.

Due to the reasons described above, the power transmitting chain of the present invention has both a high-speed capability and also a high maximum power capability. Thus, the power transmitting chain of the present invention is applicable to a diverse range of installations.

It is the primary object of the present invention to provide power transmitting chains, for use with expansible, variable pitch diameter sheaves, so designed to reduce vibrations, have a low weight per unit length, and be applicable to both single and double row sheaves; and thereby provide a chain with both a high maximum power and a high maximum speed capability.

A further important object of the invention is to provide power transmitting chains for use with expansible, variable pitch diameter sheaves, having chain members formed to provide parti-cylindrical surfaces for engaging the sheave, and having a configuration which has a low weight per unit length.

Another important object of the invention is to provide joint pins for chains used with expansible, variable pitch diameter sheaves, which provide parti-cylindrical surfaces for engaging the sheave.

Still another object of the invention is to provide joint structures for power transmitting chains, used with expansible, variable pitch diameter sheaves, which will provide parti-cylindrical surfaces for engaging the sheave, and will also provide the means of properly positioning the parti-cylindrical surfaces prior to their eengaging the sheaves.

In the accompanying drawings, forming a part of this specification and in which like reference characters are employed to designate like parts throughout the same;

FIGURE 1 is a plan view of a length of power transmitting chain embodying the present invention, FIGURE 2 is a partly side and partly sectional view taken on line 2—2 of FIG. 1, FIGURE 3 is a sectional view taken on line 3—3 of FIG. 2 showing the chain engaging conical driving flanges of an expansible, variable pitch diameter sheave, FIGURE 4 is a side elevational view partly in section of a portion of a conical driving flange of an expansible, variable pitch diameter sheave and an end portion of a pin embodying the present invention, FIGURE 5 is a plan view of a conical driving flange of a variable pitch diameter sheave and an end portion of a pin embodying the present invention, FIGURE 6 is a plan view of a length of power transmitting chain embodying a modification of the invention, FIGURE 7 is a partly side elevational and partly sectional view taken on line 7—7 of FIG. 6, FIGURE 8 is a sectional view taken on line 8—8 of FIG. 7 showing the chain engaging a conical driving flange of a variable pitch diameter sheave, FIGURE 9 is a perspective view of a bushing member of the chain joint illustrated in FIG. 6, FIGURE 10 is a diagrammatic view showing the configuration of a pitch hole of the chain illustrated in FIG. 1 with the adjacent pitches of links arranged in a straight-line position, and FIGURE 11 is a diagrammatic view similar to FIG. 10 but illustrating the configuration of a pitch hole with the adjacent pitches of links articulated out of a straight-line position in one direction.

In the drawings, wherein for the purpose of illustration are shown the preferred embodiments of the present invention, and first particularly referring to FIGS. 1 to 5, inclusive, there is illustrated a length of power transmitting chain 21 that is used in conjunction with a variable speed transmission having expansible, variable pitch diameter sheaves 22 formed with opposed conical driving flanges 23. The power transmitting chain 21 includes the alternate pitches A and B, each one of which is made up of a suitable number of links 24. Each one of the links 24 is of a bar-bell or figure 8 configuration to provide the maximum strength for a given weight. The end portions 26 of the links 24 of adjacent pitches A and B are arranged in overlapped relationship with the end portions of links of each pitch alternating with the links of the adjacent pitches transversely of the chain 21. It is to be understood that the number and arrangement of the links 24 and adjacent pitches A and B may be varied in the conventional manner to meet the requirements of particular installations.

Formed in the end portions 26 of each link 24 are pitch holes 27 which are transversely aligned in the adjacent pitches of links to receive a joint pin 28 which connects the adjacent pitches A and B for articulating movement as the chain passes around sheave 22.

Referring now to FIGS. 2 to 5 for a detailed description of the pitch holes 27 and pins 28. FIGURE 2 illustrates adjacent pitches A and B arranged in a straight-line position or with the line of centers between the axis of articulation of the adjacent pitches forming a straight-line. FIGURE 3 illustrates the pins 28 which are formed with a parti-cylindrical portion 29 and a planar portion 31 extending along one side thereof. A cross-section transversely of a pin 28, as illustrated in FIG. 2, shows the parti-cylindrical portion as a parti-circular line segment and the planar portion as a chord thereof. The end surfaces 33 are formed in a parti-cylindrical shape with the parti-cylindrical surfaces having a common axis extending perpendicular to the longitudinal axis of the pin 28. The longitudinal axis of pin 28 is shown in FIG. 3 as line segment F—F. The common axis of the parti-cylindrical surfaces 33 passes thru point G and lies above the longitudinal axis F—F of the pin 28. A longitudinal cross-section of the pin shows the end surfaces 33 as two parti-circular line segments of a common circle partly shown in phantom, having its center at point G. Each end surface 33 of the pin 28 contacts one of the opposed conical driving flanges 23 of the expansible, variable pitch diameter sheave 22. It is to be understood that the point G, through which the common axis of the end surfaces passes, may be moved slightly upward or downward from the position shown in FIG. 3 so long as point G lies above the axis F—F.

FIGURE 5 illustrates a plan view of an end portion 34 of pin 28 and further illustrates the beveled surfaces 35 extending down either side of the parti-cylindrical end surfaces 33. The beveled surfaces 35 provide clearance so that the pins 28 mesh smoothly into engagement with the sheave 22.

FIG. 2 best illustrates the pitch holes 27 which pass transversely through each end portion 26 of the link members 24. Each of the pitch holes 27 is so formed to provide a parti-cylindrical bearing surface 36 which is adjacent to and conforms with the parti-cylindrical portion of pin 28. The cylindrical bearing surfaces 36 of the pitch hole 27 subtends an angle which is slightly greater than the angle subtended by the parti-cylindrical portion 29 of pin 28. Also each of the pitch holes 27 is so formed to further provide a first planar portion 37 parallel to the longitudinal axis of the link and extending outwardly from the center thereof. A second planar surface 38 extends between and connects the ends of the first planar surface 37 and the bearing surface 36. The configuration of each pitch hole 27 allows for limited circumferential movement of pin 28 within each pitch hole.

With pin 28 disposed within pitch hole 27 in the position illustrated in FIG. 2, the angle between the planar portion 31 of the pin and the second planar surface 38 of the pitch is equal to or slightly greater than the maximum angle through which adjacent pitches A and B articulate as chain 21 passes around sheave 22.

FIGURE 3 is a side elevational view of pin 28 and illustrates the two circumferential grooves 32, which are formed in opposite end portions of pin 28 and spaced equal distances outwardly of the horizontal axis of the pin. The pin 28 is positioned within the pitch holes 27 with the grooves 32 located outwardly of the outermost link on either side of the chain 21. Fitted into grooves 32 are retaining rings 39 which secure pin 28 in the pitch holes 27 and permit limited axial movement of the pin transversely of links 24. Each retaining ring 39 is of the configuration of a standard E-ring.

A variable speed transmission utilizing the chain of the present invention, as described above, usually includes a driving and a driven member, both of which are expansible, variable pitch diameter sheaves 22. Each of the sheaves 22 includes two opposed driving flanges 23, each having a conical driving surface 41. By means of an appropriate mechanism the opposed driving surfaces 41 may be moved toward one another or away from each other to respectively increase or decrease the effective pitch diameter of sheave 22 for a given design of chain 21. A transmission of the type described above is sold by Link-Belt Company and advertised in Link-Belt brochures numbered 2873 and 2874.

A chain embodying the present invention is trained around both the driving and driven sheaves 22 so that the parti-cylindrical end surfaces 33 of the pin 28 engage the opposed conical driving surfaces 41. Usually the pitch diameters of both sheaves 22 are changed simultaneously to vary the relative speeds of the driving and driven members. As the pitch diameter of sheave 22 is reduced, the point of contact between the conical driving surfaces 41 and the parti-cylindrical end surfaces 33 of the pin 28 moves inwardly toward the axis of the sheave. Also as the pitch diameter of the sheave 22 is increased, the above mentioned contact point moves outwardly of the axis of the sheave.

The contact area between the parti-cylindrical end surfaces 33 and the conical driving surfaces 41 of the sheave 22 is theoretically elliptical in form. For the end surfaces 33 of the pin 28 to properly contact the opposed driving surfaces, the pin must enter the sheave with the common axis of the parti-cylindrical end surfaces parallel to a line that is tangent to the pitch circle of the sheave at a point thereon corresponding to the point of contact between the pin end surface and the driving surfaces 41 of the sheave. As the chain 21 articulates around the sheave 22 the axis of the parti-cylindrical surfaces 33 is always parallel to a line that is tangent to the pitch circle at the point of contact between the driving surfaces 41 and the end surfaces 33 of pin 28.

FIGS. 10 and 11 may be referred to for a better understanding of the method of positioning the pin 28 so that the parti-cylindrical end surfaces 33 initially engage the conical driving surfaces 41 in the proper orientation. FIG. 10 illustrates two links 42 and 43 of adjacent pitches arranged in a straight-line relationship, and FIG. 11 shows the same two links articulated out of a straight-line position as they would be when the chain passes around a sheave. Both links 42 and 43 are of the same configuration as the above described link 24 of chain 21, and the reference characters 42 and 43 have been used merely to clarify the description.

When the links are arranged in a straight-line relationship, as shown in FIG. 10, the pitch holes 27 of the overlapped end portions of the links 42 and 43 are in alignment to allow the pin 28 to pass therethrough. With the links 42 and 43 of adjacent pitches arranged in this relationship, the first planar land 37 of link 42, which is parallel to the longitudinal axis of link 42, is co-planar with the first planar land 37 of link 43, and the two lands cooperate to form one planar surface which is in a juxtapositional relationship to the planar surface 31 of the pin 28. Thus with the links in the above described relationship the pitch hole 27, formed by the adjacent links 42 and 43, confines the pin 28 to prevent rotational movement thereof.

The common axis of the parti-cylindrical end surfaces 33 passes perpendicular to the longitudinal axis of the pin 28 and is displaced radially outwardly therefrom. Planar surface 31 of pin 28 is parallel to the common axis of the parti-cylindrical end surfaces 33 and is positioned diametrically opposite thereto. Thus with the pin 28 so confined within the pitch hole, the axis of the parti-cylindrical surfaces 33 passes above the axis of the cylindrical portion 36 of the pitch hole 27. Relative to a sheave, the chain enters therein with the planar surface defined by the co-planar portions 37 located radially inwardly of the common axis of the parti-cylindrical end surfaces. Immediately prior to the pin 28 engaging the conical driving surfaces of a sheave, the two adjacent links 42 and 43 associated with the pin are in a straight-line relationship thus properly orienting the pin prior to its engaging the sheave.

As the chain articulates around a sheave the planar land 37 of link 42 is pivoted out of alignment with the corresponding planar land 37 of link 43. Also as the chain articulates around the sheave the planar land 38 of link 42 is pivoted toward the first planar land 37 of link 43, and when the chain is articulated to its maximum extent the pitch hole 27 assumes the configuration shown in FIG. 11. With the chain in its fully articulated position, land 37 of link 42 is pivoted into alignment with land 38 of link 43, and land 38 of link 42 is pivoted into alignment with land 37 of link 43. Thus, as the chain articulates around a sheave the lands 37 and 38 of links 42 and 43 are so positioned to restrict rotational movement of pin 28 within the pitch hole 27.

As pin 28 disengages from the sheave the adjacent links 42 and 43 return to a straight-line relationship as shown in FIG. 10. When the pin has completely disengaged from the sheave, the lands 37 again assume a co-planar relationship for confining the pin against rotational movement and for properly orienting the latter prior to its engaging the other sheave of the power transmission.

The configuration of the pitch holes 27 and the pin 28 cooperate to limit articulation of chain 21 to only one direction, thus forming what is commonly referred to as a no-back bend chain. Among the advantages of a no-back bend chain is that the whiplash effect caused by the pins entering the sheave in a periodic fashion is reduced. The whiplash effect, which is vibrations in the portion of chain entering the sheave, results from the pins being given an upward movement as they engage the sheave. Ideally the pin 28 should initially engage the sheave 22 at the point of tangency on the pitch circle of a line that is parallel to a line passing through the axis of both sheaves.

In a chain that is designed to articulate in both directions, the section of chain entering the top of a sheave will have a bowed configuration. With the chain being bowed, the pin will initially engage the sheave at a point which is below the ideal point and be given an upward movement during the first few degrees of its travel around the sheave and then travel down the side of the sheave. The next pin, and each succeeding one, will go through the same upward motion in a periodic manner. This periodic upward movement of the pins is imparted to the portion of chain entering the sheave causing vibrations which limit the maximum speed at which the chain may operate.

If the portion of chain entering the top of the sheave is not permitted to articulate in an upwardly direction, then it will not bow, and a line passing through the points of articulation of a no-back bend chain will be tangent to the pitch circle of both sheaves and parallel to a line passing through the axis of both sheaves. Since the chain is not bowed, the pin will initially engage the sheave at the ideal point on the pitch circle. When the pin initially engages the sheave at the ideal point, it is not given the above described initial upward movement which causes the vibrations. For the above reason a chain which only articulates in one direction will have less inherent vibrations, and therefore have a higher maximum speed capability than a chain which articulates in both directions.

In the drawings, wherein for the purpose for illustration are shown the preferred embodiments of the invention, and now particularly referring to FIGS. 6 through 9, inclusive, there is illustrated a length of power transmitting chain 45 embodying a modification of the present invention. The power transmitting chain 45 includes the alternate pitches C and D, each one of which is made up of a suitable number of links 51, which are similar in overall configuration to the links 24 as illustrated in FIGS. 1 to 5, inclusive.

The shape of the pitch holes 48 in the end portions 50 of the links 51 are modified to provide for the addition of bushing members 49. It is furthermore to be understood that the number and arrangement of the links 51 of adjacent pitches C and D may be varied in the conventional manner to meet the requirements of particular installations. The pins 46 of this modification of the invention are identical in form to the pins 28 of the first described embodiment, and each pin is formed with a parti-cylindrical portion 52 and a planar portion 53 extending along one side thereof. In the manner described above the pins 46 are retained within the pitch holes 48 by retaining rings 47.

The bushing member 49, as illustrated in perspective in FIG. 9, is formed with two co-axial parti-cylindrical surfaces 54 and 56, with the parti-cylindrical surface 54 being of a greater radius than that of surface 56. Surface 56 conforms to the cylindrical portion 52 of pin 46 and is adjacent thereto when the pin and bushing 49 are disposed within pitch holes 18. The two parti-cylindrical surfaces 54 and 56 are joined together by planar surfaces 57 extending radially outwardly of the axis of the parti-cylindrical surfaces. The end surfaces 58 of bushing 49 are formed in an arcuate shape.

Each of the pitch holes 48 of the links 51 is so formed as to provide three arcuate pin confining surfaces 59, 61 and 62, all of which have a common axis extending transversely of the link 51. Also the pin confining surfaces 59, 61, and 62 are formed with the same radius so that they all conform to the configuration of the parti-cylindrical portion 52 of pin 46. Each of the pitch holes 48 is so formed as to provide a load bearing land 63 adjacent to the nearest end of its link 51. The load bearing land 63 has a parti-cylindrical configuration with a radius substantially equal to the radius of the parti-cylindrical surface 54 of the bushing member 49, and the angle subtended by the parti-cylindrical load bearing surface is equal to the angle subtended by the surface 54. Planar surfaces 64 and 65 extend inwardly from the terminal ends of the load bearing land 63 and connect the latter respectively to the pin confining surfaces 59 and 62.

On the side of the pitch hole opposite to the load bearing land 63, a second parti-cylindrical land 66 is formed at a radius substantially equal to the radius of the parti-cylindrical surface 54 of bushing 49. Land 66 subtends an angle slightly greater than the angle subtended by the parti-cylindrical surface 54 of bushing 49 to allow for a limited circumferential movement of the bushing disposed on the side of the pitch hole 48 adjacent to the center of the link 51.

Planar surfaces 67 and 68 extend from the terminal ends of the parti-cylindrical land 66 and connect the latter respectively to pin confining surfaces 59 and 61. The lower side surface 57 of bushing 49 is in a juxtapositional relationship to planar surface 68 when the chain is in a straightline position, as illustrated in FIG. 7.

A first planar land 69 extends from the lower terminal point of the pin confining surface 61 and is parallel to the longitudinal axis of the link 51. Planar land 69 corresponds to the planar land 37 of link 24 of the first described embodiment of the present invention. When the pin is in the position shown in FIG. 7 the planar land 69 is in a juxtapositional relationship to the planar surface 53 of the pin 46. A second planar land 71 extends between and connects the first planar land 69 and the lower terminal point of the pin confining surface 62. With the pin in the position shown in FIG. 7, the angle between the second planar land 71 and the planar surface 53 of pin 46 is equal to or slightly greater than the maximum angle through which the chain articulates as it travels around the sheave.

Pins 46 and pitch holes 48 of links 51 cooperate in the manner described for the first embodiment of the invention to properly orient the parti-cylindrical end surfaces 70 of the pins prior to their initially engaging the driving faces 73 of the flanges 74 of a variable pitch diameter sheave 75. Also the pitch hole 48 and the bushing 49 cooperate to permit articulation of adjacent pitches C and D in only one direction.

With the adjacent pitches C and D of the chain in a straight-line relationship, as illustrated in FIG. 7, the bushing nearest the center of a link 51 is permitted limited circumferential movement in an upwardly direction within the pitch hole of that link. The last mentioned bushing 49 also passes through the adjacent link 51 on the side of the pitch hole 48 nearest the end of its link. The pitch holes 48 are so formed that a bushing member 49 passing through the side of the pitch hole nearest the end of a link 51 is confined against circumferential movement relative thereto. As adjacent pitches C and D, as illustrated in FIG. 7, are articulated in an upwardly direction the bushing 49 passing through the side of a pitch hole 48 nearest the end of a link 51 is wedged against the planar surface 68 of the pitch hole of the adjacent link.

This wedging action prevents articulation of adjacent pitches in an upwardly direction.

As the adjacent pitches C and D are articulated downwardly, the portion of the pitch hole defined by surfaces 63, 64, and 65 move the bushing 49 confined therein toward surface 67 located on the side of the pitch hole nearest the center of the adjacent link. The pitches C and D can be articulated downwardly until surface 57 of bushing 49 engages the planar surface 67 of the pitch hole 48. The angle through which the chain 45 may articulate in a downwardly direction is equal to or greater than the maximum angle through which the chain will articulate as it travels around sheave 75.

In the manner described above the chain 45 is limited to articulation in only one direction by cooperation of the pitch hole with the bushing members 49. The bushings 49, included in this modification of the invention, also function to distribute the pin wear over the full width of the pitch rather than only over the area of contact between the links and the pin. It will be noted that the addition of the bushings 49 effectively increases the area over which the wear is distributed to twice that of the first embodiment of the invention. The addition of bushings 49, although slightly increasing the weight per unit length of the chain 45, increases the load bearing capacity and the life of the chain.

A further modification of the invention includes selectively hardening the link members 24 and 51 respectively of chain 21 and 45 only at their load bearing or wear surfaces, while leaving the rest of the link relatively soft. To accomplish the selective hardening, the link members are first stamped to their approximate configuration, and then coated or plated with a material which is substantially impervious to the usual carburizing process—such as copper or nickel. Subsequent to the plating operation, the plating material is removed only from the surfaces which are desired to be hardened—such as surfaces 36, 37 and 38 of link 24 as illustrated in FIG. 2. The coating may be removed by either a milling operation or by a second stamping operation in the known manner.

The link, with the plating material removed from the surfaces to be hardened, is then subjected ot a carburizing process by imbedding the link in a carbonous substance or gas, or other suitable carburizing material, so that the latter contacts the exposed load bearing surfaces. The link and carburizing substance are then subjected to suitable temperatures to complete the carburizing process.

The link member is selectively hardened only at the load bearing or wear surfaces so that the remaining portion of the link will not be brittle. This process produces a link with good wear characteristics and also with a suitable toughness to reduce the tendency of breakage in the link members.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. A power transmitting chain for use with an expansible, variable pitch diameter sheave of a variable speed transmission, the chain being formed by a multiplicity of pitches, each of the pitches comprising:

a plurality of laterally spaced links all of which have their opposite end portions overlapped with the associated end portions of the links of the adjacent pitches, each link being formed with an aperture through each of its end portions;

a joint pin passing through the apertures of the overlapped end portions of a pair of adjacent pitches and extending beyond the outermost links, the pin having opposite end surfaces formed to operatively contact the variable pitch diameter sheaves, the apertures and the pin having opposed surfaces formed to properly position the latter prior to its contacting the sheave; and retaining means fastened to the pin for limiting axial movement thereof relative to the connecting links.

2. A chain having pitches as defined in claim 1 further characterized by the opposite end surfaces of the pin being formed in the shape of parti-cylindrical surfaces having a common axis.

3. A chain having pitches as defined in claim 1 further characterized by the pin and the apertures being formed with opposed surfaces to permit bending of all of the pitches in only one direction, 4. A chain having pitches as defined in claim 1 further characterized by:

the joint pin being generally cylindrical in shape and having a flattened portion extending axially along one side thereof; and the apertures being formed to radially confine the pin, the apertures also formed with a portion cooperating with the flattened portion of the pin to rotatably confine the latter in one position when the adjacent pitches associated with the pin are in a straight-angular relationship, the apertures also being formed to permit limited rotation of the pin when the adjacent pitches associated with the pin are pivoted to an obtuse-angular relationship relative one to the other.

5. A chain having pitches as defined in claim 4 further characterized by each of the apertures having a surface portion adjacent to the flattened portion of the pin, the last mentioned portion of each of the apertures being defined by two segments formed in an obtuse-angular relationship to permit limited rotation of the pin only when the adjacent pitches associated with the pin are pivoted to an obtuse-angular relationship relative one to the other.

6. A chain having pitches as defined in claim 1 further comprising bushing means positioned between and in a juxtapositional relationship to the pin and the interior surface of the apertures.

7. A chain having pitches as defined in claim 6 further characterized by the opposite end surfaces of the pin being formed in the shape of parti-cylindrical surfaces having a common axis.

8. A chain having pitches as defined in claim 1 further characterized by the links being hardened only at the load bearing surfaces of the apertures.

References Cited

UNITED STATES PATENTS

| | | | |
|---|---|---|---|
| 2,550,431 | 4/1951 | Shaw | 74—230.17 |
| 2,690,678 | 10/1954 | Bendall | 74—245 |
| 3,049,933 | 8/1962 | Besel | 74—230.17 |
| 3,089,346 | 5/1963 | Dittrich et al. | 74—236 |

FRED C. MATTERN, Jr., *Primary Examiner.*

J. A. WONG, *Assistant Examiner.*